United States Patent Office 3,514,340
Patented May 26, 1970

3,514,340
METHOD OF MAKING AND FUEL CELL ANODE CATALYST COMPRISING NICKEL, MOLYBDENUM, BORON AND PHOSPHORUS
Theodore L. Larson and Dirk Pouli, Milwaukee, Wis., assignors to Allis-Chalmers Manufacturing Company, Milwaukee, Wis.
No Drawing. Filed June 5, 1967, Ser. No. 643,385
Int. Cl. H01m 27/04; C23c 23/02; B01i 11/82
U.S. Cl. 136—86                                    14 Claims

ABSTRACT OF THE DISCLOSURE

A fuel cell anode catalyst comprising an electrically conductive powder, the particles of which are coated with a mixture of nickel, boron, phosphorus and molybdenum. The catalyst is produced by adding the conductive powder and an alkali borohydride initiating agent to an aqueous solution containing a dissolved nickel salt, a dissolved molybdenum compound, a condensed polyphosphate complexing agent, a reducing agent such as an alkali hypophosphite, and a suitable base to render a pH of about 11.5. The mixture is then vigorously agitated for about 10 minutes while the coating is reduced onto the powder particles. The powder is then filtered from the solution, washed, and dried.

BACKGROUND OF THE INVENTION

This invention relates generally to fuel cell anode catalysts. More specifically, this invention relates to a new and improved fuel cell anode catalyst comprising an electrically conductive substrate coated with a material consisting essentially of nickel with small additions of boron, phosphorus and molybdenum.

The term fuel cell, as used herein, refers to those electrochemical devices that convert the free energy of a chemical reaction directly to electrical energy. Such devices are well known in the art and although there are differences between various cells, a discussion of some of their common characteristics will aid in the understanding of our invention.

As is known, oxidation-reduction reactions are accompanied by the transfer of electrons from the reductant to the oxidant. In individual fuel cells, the oxidation reaction and reduction reaction take place at spacially separated electrodes. At each electrode there occurs what is called a half-cell reaction. One electrode, called the anode, is the site of the oxidation half-cell reaction. A reactant, referred to as the fuel that is oxidizable with respect to some oxidant is supplied by suitable means to the anode, and is thereat electrochemically oxidized. Oxidation of the fuel releases electrons to the anode. At the other electrode, called the cathode, spaced apart from the anode by a suitable electrolyte, the other half-cell reaction simultaneously takes place. A reactant called the oxidant, reducible with respect to the fuel, is supplied by suitable means to the cathode, and is thereat electrochemically reduced. This reaction takes up electrons from the cathode.

These two half-cell reactions result in the cathode tending to have a deficiency of electrons and the anode to have an excess. This tendency is relieved by the transfer of charge electronically through an external circuit connecting the electrodes, accompanied by the ionic transfer of charge through electrolyte. The current produced in the external circuit can do useful work. Production of current will continue so long as fuel and oxidant are supplied and waste products exhausted.

The voltage of the individual fuel cell is limited by the theoretical free energy change ($\Delta F$) for the reaction at the fuel cell operating temperature. The amperage of the cell is determined by the rate of reaction and the size of the cell. In practice, several individual fuel cells are coupled in cooperative electrical connection to obtain the desired output. A plurality of cells so connected is known as a module.

Although the reaction between oxidant and fuel is thermodynamically spontaneous, the respective reactants must attain an activated state before they can react. The energy input required to reach an activated state, i.e., heat of activation, partly determines the speed of reaction. The greater the energy that is required for activation, the fewer are the molecules possessing this energy at a given temperature, and the slower is the reaction.

In the past, to speed reaction, an external heat source was used to heat fuel cell reactants and thereby activate them. More recently, catalysts have been employed to increase reaction rate. Through a mechanistic bypass a catalyst brings about reaction with a smaller heat of activation. Catalysts have made possible the operation of so called low temperature fuel cells (about 25° to about 150° C.) without a lessening in cell output compared to cells operating at higher temperature. It follows that with more efficient catalysts, the activation energy can be decreased and greater cell outputs attained at a given voltage and temperature.

SUMMARY OF THE INVENTION

This invention is predicated upon our discovery of a new and improved nickel base anode catalyst, the method of producing the catalyst and the anode fabricated therefrom. The nickel base anode catalyst consists essentially of a conductive metallic powder, each particle thereof having a coating comprising a mixture of nickel, boron, phosphorus and molybdenum. Fuel cell anodes fabricated from this powdery catalyst exhibit extraordinary high outputs compared to previously known nickel base anodes.

Accordingly, it is a primary object of this invention to provide a new and improved fuel cell anode catalyst consisting essentially of a conductive metallic powder coated with nickel, boron, phosphorus and molybdenum.

It is another primary object of this invention to provide a nickel base fuel cell anode which is superior to other known nickel based fuel cell anodes.

It is a further primary object of this invention to provide a method for the manufacture of the anode catalyst disclosed herein.

These and other objects and advantages are fulfilled by this invention as will become apparent from an understanding of the following detailed description.

DESCRIPTION OF THE PREFERRED EMBODIMENTS

Broadly, the above catalyst is best obtained by the simultaneous chemical reduction of nickel, boron, phosphorus and molybdenum onto minute particles of an electrically conductive metal powder from an aqueous alkaline solution. To be more specific, the solution contains soluble source of nickel and molybdenum, a condensed polyphosphate complexing agent, a reducing agent such as an alkali hypophosphite, a suitable base for pH control and an initiating agent such as an alkali borohydride.

The source of nickel must be water soluble and is preferably a nickelous salt having an anion that will not interfere with the reduction process by itself either precipitating or undergoing a redox reaction. Although we find that nickel sulphate, $NiSO_4$, is preferable, other nickel salts such as nickel chloride, $NiCl_2$, and nickel acetate, $Ni(C_2H_3O_2)_2$, will suffice. The only requirement is that the nickel salt be one in which the anion will not interfere with the reduction process.

The source of molybdenum must also be a water soluble compound, preferably an oxide or salt which will leave the Mo ion in the +2 to +6 oxidation state. Examples of suitable molybdenum compounds are molybdic anhydride, $MoO_3$, molybdenum dichloride, $MoCl_2$ and molybdenum pentachloride, $MoCl_5$.

The alkali hypophosphite reducing agent will provide a source of phosphorus, while the alkali borohydride initiating agent will provide a source of boron. Although any compatible alkali hypophosphite and borohydride will suffice, for economic reasons we have preferred to use either sodium hypophosphite, $Na(H_2PO_2)$, or potassium hypophosphite, $K(H_2PO_2)$, as the reducing agent; and sodium borohydride, $NaBH_4$, or potassium borohydride, $KBH_4$, as the initiating agent.

Prior to the actual reduction, the solution pH should be adjusted to a value of about 11.5 by the addition of a suitable base such as ammonium hydroxide, $NH_4OH$.

The function of the condensed phosphate is to complex the nickel so that precipitation of basic nickel salts is prevented when the pH is adjusted upward by the addition of the hydroxyl ion. Therefore, to this end, any condensed polyphosphate which will perform the complexing function is suitable. For this purpose, we have preferred to use sodium pyrophosphate, $Na_4P_2O_7$.

The substrate powder upon which the nickel, boron, phosphorus and molybdenum are reduced, serves merely as a collector or base for the catalytic coating. Therefore, its chemical composition is not too critical. However, since the powder will comprise the main body of any fuel cell anode fabricated from this catalyst, the powder should be electrically conductive. Furthermore, since the catalytic coating on the individual powder grains may be partially discontinuous and somewhat porous, the substrate powder should be of a metal that will not corrode in, or react with, the fuel cell electrolyte to which it will be subjected. Finally, since the coated powder must be compacted into fuel cell anodes, the granular characteristics of the powder should be such as will assure a good mechanical bond when compacted. That is to say, an irregular configuration is desired such as a dendruritic, angular or compound grain shape. Although the powders we have found to be most ideal are the carbonyl nickel powders which have very irregular grain shapes and size distributions well under 10 microns, other powders such as carbon, graphite or iron are suitable, but to a more limited extent. Although there is no critical limit on size distribution of the powder, it should be kept in mind that a reasonably high surface area is preferred to obtain optimum cell characteristics. Therefore, the carbonyl nickel powders, being finer than 10 microns and having an excessively large surface area, are preferred to powders having larger grain sizes and more symmetrical grain configurations.

In the practice of this invention therefore, a typical bath would contain a nickel salt such as nickel sulphate, a molybdenum compound such as molybdic anhydride, a reducing agent such as sodium hypophosphite, a complexing agent such as sodium pyrophosphate and sufficient suitable base such as ammonium hydroxide to render a pH of about 11.5. As stated previously, the complexing agent is needed to prevent the nickel from being precipitated as a nickel salt. Then, the pyrophosphate forms a nickel-pyrophosphate complex which is in equilibrium with nickelamine complex according to the equation:

To this solution is added the conductive metal powder such as carbonyl nickel and an initiating agent such as potassium borohydride. The solution is then vigorously agitated for about 10 minutes while nickel, molybdenum, boron and phosphorus are reduced onto each particle of carbonyl nickel. To exemplify, the nickel ions are reduced by the hypophosphate ion according to the following equation:

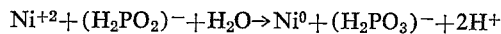

The details of the reduction reactions for the molybdenum, boron, and phosphorus are rather uncertain, and therefore cannot be exemplified here.

The catalytic coating on the substrate powder should dominately be nickel. That is, the catalytic coating should be at least about 70 weight percent nickel with the other constituents, boron, phosphorus, and molybdenum comprising the balance. However, the relative amounts of the boron, phosphorus and molybdenum is not critical. A typically ideal catalytic coating would be one comprising about 90 weight percent nickel, 7 weight percent molybdenum, 2 weight percent phosphorus and 1 weight percent boron.

The extent or weight of the catalytic coating with respect to the powder substrate is not critical since the primary purpose of the powder is to provide a conductive substrate upon which to deposit the catalyst. Therefore, the amount of catalytic coating on the substrate may vary anywhere from a trace amount to a dominating amount. It should be obvious, however, that when only a trace amount of coating is applied, the full potential of this invention will not be realized. On the other hand, if the coating is greater in volume than the substrate powder, the coating is greater than needed. We have, therefore, sought to keep the ratio of substrate to catalyst coating anywhere from about 25:1 to 1:1. Hence, at a ratio of 25:1, we believe that there would be sufficient catalyst coating on the substrate to yield improved results in a fuel cell anode fabricated therefrom as compared to a noncatalyzed nickel anode. As stated above, ratios as high as 1:1 would surely provide a heavier coating than is actually necessary for optimum results. Furthermore, coatings this heavy would not only add to the expense of the catalyst, but could adversely affect the granular characteristics of the powder. Accordingly, we believe that a ratio in the vicinity of about 6:1 is perhaps ideal.

It should be apparent that the absolute amounts of reagents in the depositing solution are not critical. What is of some concern is the relative amounts of each constituent with respect to the nickel. Therefore, since the nickel must ideally comprise from 70 to better than 90 weight percent of the coating, the remaining constituents should be adjusted accordingly. The amount of nickel used will depend upon the weight of coating desired upon a given weight of powder substrate, and the extent to which the coating is to comprise nickel. The quantity of molybdenum compound present can then be adjusted so that the material precipitated will comprise from 1 to 10 percent molybdenum.

The quantities of the other reagents will depend more closely upon the amount of nickel used. When an alkali pyrophosphate is used as a complexing agent, an amount of at least one mole of $P_2O_7^{-4}$ should be present for each mole of $Ni^{++}$. This is the minimum pyrophosphate required for a complete and succesful complexing of the nickel. Preferably however, 1.18 moles $P_2O_7^{-4}$ should be present for each 1.00 mole of $Ni^{++}$. While the pyrophosphate can hydrolyze to form orthophosphates, this is not material to the performance of this invention, because the nickel can easily be reduced before this relatively slow hydrolysis becomes a serious problem.

The hypophosphite should be provided in sufficient quantity to reduce all nickel, molybdenum and boron. Since the hypophosphite is decomposed simultaneously to the reduction of nickel, an amount should be provided which is in excess of that stoichiometrically required. If insufficient hypophosphite is provided, no harm is done except that not all of the nickel, molybdenum and boron will be reduced. We have found that at least 3.46 moles $(H_2PO_2)^-$ per combined total of nickel, molybdenum and boron should be sufficient to completely delete the solution of these ions.

The amount of alkali borohydride used is not critical. Although we have preferred to stay within a rather broad range of from 0.025 to 0.5 mole $BH_4^-$ per mole of nickel, there is no absolute upper limit, and a practical lower limit would be at least about 0.005 mole $BH_4^-$ per mole of nickel.

As stated previously, the concentration of ammonia, or ammonium hydroxide, should be that necessary to yield a pH of 11.5. Typically, this would require anywhere from 4.70 to 11.22 moles of ($NH_4OH$) per mole of nickel. During the reduction process, the pH should drop from about 11.5 to about 9. It is not necessary to adjust the pH after reduction is commenced.

The temperature of the solution during the reduction process should preferably be within the range of 25° C. to 70° C. and ideally at about 60° C. Although lower temperatures could be maintained, it should be noted that the reduction rate is a function of the temperature. Hence, at temperatures below about 60° C., the reduction will proceed, but at a slower rate. Although higher temperature would cause an increased reduction rate, such temperatures should be avoided because ammonia will be driven from the solution causing a decrease in the pH of the solution.

Ordinarily, the reduction process will not commence without the alkali borohydride initiating agent. We have learned however, that if the conductive power, particularly the carbonyl nickel powder, is acid etched prior to deposition, the deposition of nickel, phosphorus and molybdenum will proceed without any initiating agent present. This is because the acid etch cleans the powder surface of any oxide film and some hydrogen is adsorbed. If the initiating agent is omitted, however, some other source of boron will have to be provided.

Turning now to a detailed embodiment of the practice of this invention, we shall outline the production of a batch of our catalyst.

An aqueous solution was prepared containing 150 grams of nickel sulphate (enough to render 33.5 grams of nickel), 6 grams of molybdic anhydride, 210 grams of sodium hypophosphite, 180 grams of sodium pyrophosphate, 860 milliliters of a 29 percent aqueous solution of ammonia, and 6 liters of water. This solution was then heated to 62° C. and 180 grams of carbonyl nickel powder were added. The mixture was agitated for five minutes and then 4 grams of potassium borohydride dissolved in one liter of water was added. The mixture was again agitated vigorously while the reaction proceeded with the evolution of hydrogen gas. After about 10 minutes, the agitation was stopped and the solution filtered to collect the coated powder. The powder was then washed with water to remove all the reduction solution therefrom. To assure a complete wash, washing was continued until the wash water showed a neutral pH of 7.0. The powder was then dried and ready for use.

The catalyst powder produced as described above, will comprise 180 grams of carbonyl nickel substrate, and about 40 grams of catalytic coating. The catalytic coating will comprise about 33.5 grams of nickel, about 4 grams of molybdenum, about 1 gram of phosphorus and about a half a gram of boron. As noted previously, these limitations are not critical so long as the nickel comprises at least about 70 weight percent of the catalytic coating.

After the catalyst powder is washed and dried, it may be fabricated into a fuel cell anode. Most fuel cell designs require an electrode in the form of a thin sheet. The ultimate shape of the anode, however, does not depend upon one catalyst powder but upon the design of the individual cell. Any suitable fabrication technique can be used to stabilize our catalyst powder into the desired shape.

An especially suitable procedure for stabilizing the catalyst powder into an anode shape was found to be as follows: 10 grams of dry catalyst powder was added to 50 milliliters of water containing 5 milliliters of an aqueous suspension of polytetrafluoroethylene with a specific gravity of 1.1. The mixture was then stirred for about one minute and then 30 milliliters of 2-propanol were added. Stirring was continued for about 2 minutes. When stirring was stopped, the inner walls of the container were washed down with 2-propanol, and the mixture was allowed to stand for 20 minutes. After decanting the excess liquid, the catalyst sediment was mixed into a single lump and placed into a plastic sandwich bag. The catalyst, while in the plastic bag, is rolled flat. The plastic bag is then removed from around the catalyst and a nickel screen is pressed into the wet form. The screen and catalyst were then oven dried at about 110° C. for 10 minutes. After cooling, the screen supported form is ready for use as an anode.

An anode, manufactured as described above, will have characteristics superior to any other known, non-noble anode. For example, in a hydrogen-oxygen cell with the reactants at a pressure of 18 p.s.i.g., a silver cathode, a 40 percent potassium hydroxide electrolyte, and at a temperature of 90° C., the electrode of this invention will maintain a voltage in excess of 0.6 volt at a current density of 320 amps/ft.$^2$. In contrast, the best prior art, non-noble anode known to us can maintain a voltage in excess of 0.6 volt at 90° C. only at current densities below about 200 amp/ft.$^2$.

The table below presents comparative voltage-current density limitations for a pair of 3 inch by 3 inch anodes in a fuel cell test. Anode A was fabricated from the catalyst of this invention and anode B was fabricated from the best prior art non-noble anode known to us. This fuel cell test was conducted using a silver cathode, a 45 percent KOH electrolyte at 90° C., a fuel of hydrogen and an oxidant of oxygen.

TABLE

| Cell voltage with— | Current density (amp/ft.$^2$) | | | | | | | |
|---|---|---|---|---|---|---|---|---|
| | 0 | 40 | 80 | 120 | 160 | 200 | 240 | 280 |
| Anode A | 1+ | 0.95 | 0.89 | 0.83 | 0.78 | 0.73 | 0.68 | 0.64 |
| Anode B | 1+ | 0.91 | 0.81 | 0.73 | 0.67 | 0.61 | 0.55 | 0.50 |

As should be apparent, many modifications and variations could be made in our catalyst powder and our process of producing it without departing from the basic concepts. Accordingly, this invention should not be limited to the detailed examples given herein, but may be modified within the scope of the appending claims.

The embodiments of the invention in which an exclusive property or privilege is claimed are defined as follows:

1. The method of producing a fuel cell anode catalyst comprising the steps of preparing a solution consisting essentially of a dissolved nickelous salt, a dissolved molybdenum compound in which the molybdenum is in an oxidation state of from +2 to +6 and in a quantity sufficient to render no more than about 0.073 mole of molybdenum per mole of nickel, sufficient base to render a pH of about 11.5, a dissolved complexing agent in a quantity sufficient to prevent precipitation of basic nickel salts, a dissolved reducing agent which is a source of phosphorous in a quantity sufficient to reduce the nickelous and molybdenum ions, and a dissolved alkali borohydride having at least 0.005 mole of $BH_4^-$ per mole of nickel, a nondissolved electrically conductive metallic powder being present in said solution in a quantity at least equal to the combined weight of nickel and molybdenum; agitating the powder within the solution for a time sufficient to cause nickel, molybdenum, phosphorous, and boron to be reduced onto the surface of said metallic powder; and collecting, washing and drying the coated powder.

2. The method of claim 1 wherein said alkali borohydride is added to the solution last.

3. The method of claim 1 wherein said electrically conductive metallic powder comprises carbonyl nickel powder.

4. The method of claim 1 wherein said reducing agent comprises an alkali hypophosphite having in excess of about 3.4 moles of ($H_2PO_2$)$^-$ for each mole of combined nickel and molybdenum.

5. The method of claim 1 wherein said complexing agent comprises an alkali pyrophosphate having at least 1.00 mole of $P_2O_7^{-4}$ for each mole of nickel.

6. The method of claim 5 wherein said alkali pyrophosphate is in a quantity sufficient to render 1.18 moles of $P_2O_7^{-4}$ per each mole of nickel.

7. The method of claim 1 wherein the weight of said electrically conductive powder is equal to a weight of about 6 times the combined weight of nickel and molybdenum.

8. The method of claim 1 wherein said base is ammonium hydroxide.

9. A fuel cell anode catalyst consisting essentially of a mixture of at least about 70 weight percent nickel with a balance comprising some each of molybdenum, phosphorus, and boron.

10. A fuel cell anode catalyst according to claim 9 wherein the nickel content comprises about 90 weight percent.

11. A fuel cell anode catalyst according to claim 9 wherein said catalyst is a coating on an electrically conductive metallic powder.

12. A fuel cell anode catalyst according to claim 11 wherein said electrically conductive metallic powder comprises carbonyl nickel.

13. A fuel cell anode catalyst according to claim 11 wherein said electrically conductive metallic powder and the coating thereon are present in a weight ratio of about 6:1 respectively.

14. A fuel cell having a housing; a cathode and anode mounted within said housing spaced by an electrolyte; said anode consisting essentially of an electrically conductive porous support having a coating thereon consisting essentially of a mixture of at least 70 weight percent nickel with a balance comprising some each of molybdenum, phosphorus and boron; means for supplying an oxidant to the cathode; means for supplying a fuel to the anode; and means for electrically connecting said cathode and anode to a load.

References Cited

UNITED STATES PATENTS

| | | | |
|---|---|---|---|
| 3,356,536 | 12/1967 | Seim et al. | 136—86 |
| 3,364,075 | 1/1968 | Murdock et al. | 136—120 |
| 3,380,856 | 4/1968 | Pohl | 136—120 |
| 3,411,953 | 11/1968 | Larson et al. | 136—120 |
| 3,437,526 | 4/1969 | Lindholm et al. | 136—120 X |

WINSTON A. DOUGLAS, Primary Examiner

M. J. ANDREWS, Assistant Examiner

U.S. Cl. X.R.

75—.5, 109; 117—100, 130; 252—432, 437